Figure 1:
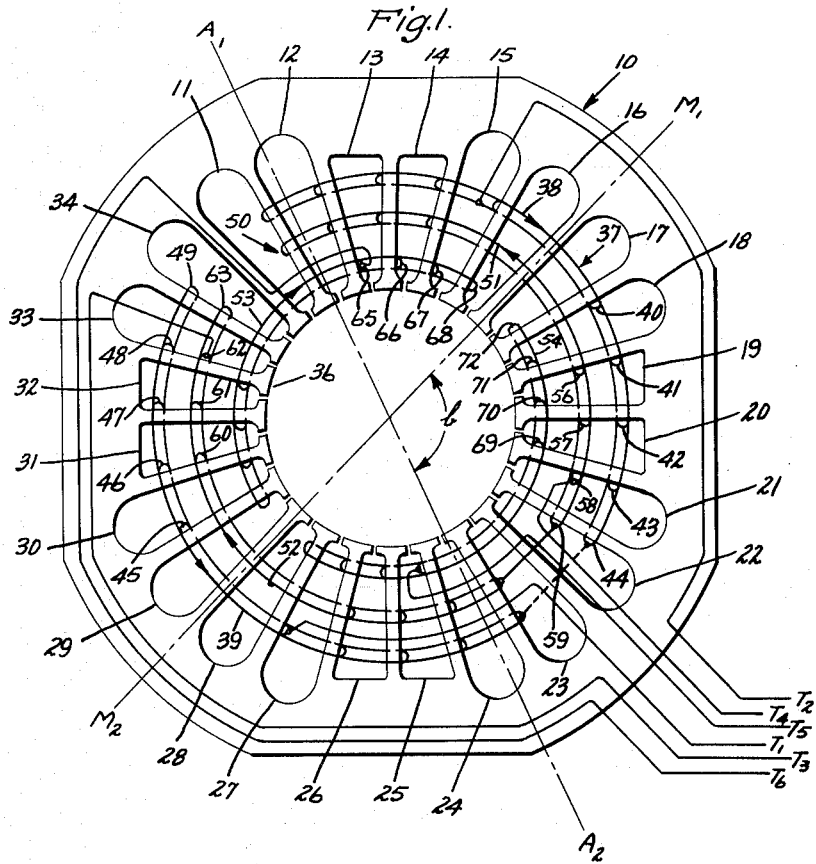

Aug. 31, 1965 R. V. ZIGLER 3,204,167

ELECTRIC MOTOR WINDING ARRANGEMENT

Filed Feb. 25, 1963

Inventor:
Robert V. Zigler,
by Henry J. Marwick
Attorney.

United States Patent Office 3,204,167
Patented Aug. 31, 1965

3,204,167
ELECTRIC MOTOR WINDING ARRANGEMENT
Robert V. Zigler, Holland, Mich., assignor to General
Electric Corporation, a corporation of New York
Filed Feb. 25, 1963, Ser. No. 260,682
2 Claims. (Cl. 318—225)

My invention relates to alternating current induction motors and more particularly to single phase motors of the type having main and auxiliary windings in nonquadrature relationship.

In a single phase induction type of electric motor, the primary member or stator is usually provided with a main winding and an auxiliary winding which are displaced with respect to each other to produce fluxes along different axes. The auxiliary or starting winding is usually displaced about 90 electrical degrees from the main winding. A secondary member or rotor is rotatably supported concentrically within the primary member for relative rotation therewith.

In many applications of a split phase type of induction motor the electrical performance of the motor may be improved by obtaining a nonquadrature relationship between the main and auxiliary windings. Conventionally, such a nonquadrature relation is achieved by positioning the auxiliary winding a predetermined number of degrees from its quadrature position with respect to the main winding. In some motor designs it is not possible to obtain the optimum nonquadrature relationship between the main and auxiliary winding since the shifting of the auxiliary winding can be accomplished only in steps of half a slot. A disadvantage of such conventional winding arrangements is that the nonquadrature relationship between the auxiliary and main winding is accomplished at the expense of winding symmetry. In motor designs in which high slot utilization is desired, a considerable amount of distortion of the winding is necessary in order to maintain the space factor of the fullest slots at an acceptable level. Excessive distortion of the winding may increase the winding harmonics and, in some cases, impair motor performance.

Accordingly, it is a general object of this invention to provide an improved motor winding arrangement for an induction type motor.

A more specific object of the present invention is to provide an improved winding arrangement wherein a more nearly optimum location of the effective axis of the auxiliary winding can be achieved as compared with winding arrangements where the secondary winding is physically shifted to obtain a desired nonquadrature relationship.

It is a further object of the present invention to provide an improved winding arrangement for induction motors of the permanent capacitor type.

In carrying out the objects of the invention in one form therof, I have provided an auxiliary winding having a direct axis section and a quadrature section associated with each permanently connected primary pole of a single phase, single speed induction motor. The coils of the direct axis sections are positioned in slots on the stator member so that the coils are symmetrically arranged with respect to the main pole axis. Each of the quadrature sections are positioned in quadrature relation with respect to a direct axis section. The effective turns $N_d$ and $N_q$ respectively, of the direct axis sections and quadrature sections are selected to provide the auxiliary winding with an effective axis that has a predtermined nonquadrature relation in the range from 105 to 120 elctrical degrees, as determined in accordance with the expression $$\text{arc tan}^{-1} \frac{N_q}{N_d}$$

with respect to the main pole axis. With this arrangement it is possible to obtain a more nearly optimum location for the effective axis of the auxiliary winding and still maintain the symmetry of the auxiliary winding with respect to the main pole axis and the quadrature axis.

Figure 2:
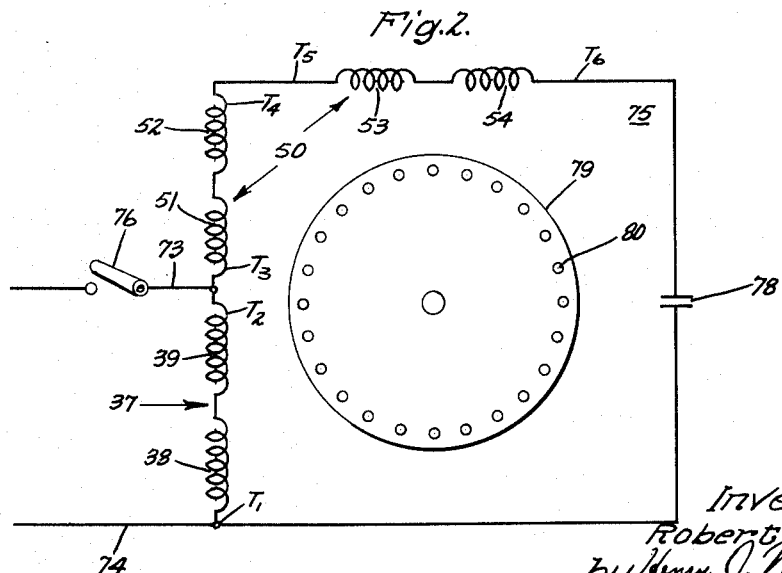

The subject matter which I regard as my invention is particularly pointed out and distinctly claimed in the concluding portion of this specification. My invention, itself, however, both as to organization and method of operation, together with further objects and advantages thereof may be best understood by reference to the following description taken in conjunction with the accompanying figures in which:

FIGURE 1 is a schematic end view of a stator core member of a single phase induction motor embodying one form of the improved winding arrangement of the invention; and FIGURE 2 is a schematic circuit diagram of the induction motor illustrating the electrical connections of the main and auxiliary windings.

Referring now to the drawings in more detail, the preferred form of my invention has been illustrated in connection with an alternating current single phase induction motor of the capacitor split phase type. A stator member 10 is shown in FIGURE 1 and is formed of a laminated core having twenty four coil accommodating slots numbered from 11 through 34 inclusive in the drawing. The slots define a corresponding number of teeth therebetween, each having an entrance in communication with a rotor-receiving bore 36 formed by the ends of the teeth.

As shown, a main winding 37, is formed of two sections 38, 39 arranged in the slots to provide two primary poles disposed along the main pole axis $M_1$–$M_2$, one pole being formed by a group of five concentric coils 40, 41, 42, 43, 44 wound to span, in effect three, five seven, nine and eleven teeth, respectively. The other primary pole is formed by five concentric coils 45, 46, 47, 48, 49 which are identically distributed in diametrically opposed slots. It will be understood, of course, that the number of turns in each coil of the main winding 37 is predetermined to provided as close to a sinusoidal wave form for the flux distribution in each winding pole as is practically possible. The precise relationship of the number of wire turns in each coil will, of course, differ with the size and type of motor.

For starting purposes, the motor of the exemplification of the invention incorporates an auxiliary winding 50 comprised of a pair of direct axis sections 51, 52 and quadrature sections 53, 54. It will be seen that the quadrature sections 53, 54 are displaced ninety electrical and mechanical degrees from the direct axis sections 51, 52. The effective turns in each of the direct axis sections 51, 52 and quadrature sections are predetermined to provide an effective axis for the auxiliary winding 50 that is in nonquadrature relationship with the main winding 37. In the illustrated exemplification of the invention, the direct axis sections 51, 52 included the groups of coils 56, 57, 58, 59 and 60, 61, 62, 63, which span 5, 7, 9 and 11 teeth of the stator member 10. The quadrature sections 53, 54 are comprised of the groups of coils 65, 66, 67, 68 and 69, 70, 71, 72, which span 5, 7, 9 and 11 teeth, respectively of the stator member 10. It will be understood that the radial centers of the quadrature sections 53, 54 are displaced ninety electrical degrees from the main pole axis $M_1$–$M_2$. As used herein, the term "quadrature" denotes a displacement of ninety electrical degrees.

As is shown in FIGURE 1, the effective axis $A_1$–$A_2$ of the auxiliary winding 50 is located at an angle $b$ from the main pole axis $M_1$–$M_2$. Angle $b$ may be determined from the following relationship:

$$b = \text{arc tan}^{-1} \frac{N_q}{N_d}$$

where $N_q$ is the number of effective turns of the quadrature sections, and $N_d$ is the number of effective turns of the direct axis sections.

From the foregoing relationship it will be apparent that the angle of the effective axis $A_1$–$A_2$ of the auxiliary winding 50 can be adjusted by varying the effective turns of the direct axis and quadrature sections to provide the desired angle. Thus, a desired nonquadrature relation between the auxiliary winding 50 and the main winding 37 can be readily achieved. An important advantage of the improved winding arrangement of the invention is that it is possible to achieve the benefits inherent in a shifted auxiliary winding arrangement without sacrificing the benefits resulting from a symmetrical winding distribution. A symmetrical winding distribution, as the term is used herein, refers to the cross-sectional area of wire in slots at the same angular location with respect to the radial center of the winding.

Further, it is possible, in accordance with the present invention, to obtain a nearly optimum location for the effective axis of the auxiliary winding since the axis of the auxiliary winding can be precisely selected by using appropriate values for the number of effective turns in the direct axis and quadrature sections.

As is shown in FIGURE 1, terminals $T_1$, $T_2$ of the main winding 37, terminals $T_3$, $T_4$ of the direct axis sections 51, 52 and terminals $T_5$, $T_6$ of the quadrature sections 53, 54 of the auxiliary winding 50 are brought out at one corner of the stator member 10. In FIGURE 2 the connections for the terminals $T_1$, $T_2$, $T_3$, $T_4$, $T_5$ and $T_6$ are shown in a schematic diagram of a permanent capacitor induction motor 75. The terminals $T_1$, $T_2$ of the main winding 37 are connected to a pair of motor input terminal leads 73, 74 which are adapted for connection to a single phase alternating power supply. A single pole, single throw switch 76 is provided to connect and disconnect the motor 75 from the power supply. Terminal $T_3$ is joined to terminal $T_2$ of the main winding 37 to place the auxiliary winding 50 in series circuit relation with the main winding 37. Also, terminals $T_4$, $T_5$ are connected to join the quadrature sections 53, 54 in series with the direct axis sections 51, 52. A capacitor 78 is connected in circuit with terminals $T_1$ and $T_6$ to produce a phase displacement between the main and auxiliary winding current. The motor 75 also includes a rotor member 79 which carries a squirrel-cage winding 80 or oher suitable secondary winding.

The following specific example of a motor winding layout incorporating the winding arrangement of the invention is given to illustrate more clearly how the invention, as described above, may be satisfactorily carried out in a standard uniform slot size motor where a winding distribution that will provide a nearly sinusoidal flux wave form is desired. The direct axis effective turns (45.4) and the quadrature axis effective turns (169) were selected to provide an effective auxiliary axis displaced approximately 105 degrees from the main winding. It will be understood that an angle of 105 degrees was selected so that a comparison could be made with an identical motor employing a conventionally shifted auxiliary winding which was displaced one slot and provided a 105 degree displacement of the auxiliary winding axis.

The coil distribution for the direct and the quadrature sections 51, 52, 53, 54 of the auxiliary winding 57 is shown in Table I. The coils were wound with a coated wire having a diameter of .0201 of an inch.

*Table I*

| Auxiliary winding | Number of turns | Total wire cross section (area in circular mills) |
|---|---|---|
| Direct axis sections 51, 52: | | |
| Coils 59, 63 | 16 | 8,000 |
| Coils 58, 62 | 15 | 7,000 |
| Coils 57, 61 | 12 | 6,000 |
| Coils 56, 60 | 9 | 4,000 |
| Quadrature sections 53, 54: | | |
| Coils 68, 72 | 59 | 30,000 |
| Coils 67, 71 | 55 | 28,000 |
| Coils 66, 70 | 47 | 24,000 |
| Coils 65, 69 | 46 | 19,000 |

The main winding 37 was wound with a .0359 inch in diameter enamel coated wire. A substantially sinusoidal flux wave form was approximated by using the coil distribution as shown in Table II.

*Table II*

| Main winding 37 | Number of turns | Total wire cross section (area in circular mills) |
|---|---|---|
| Main winding sections 38, 39: | | |
| Coils 44, 49 | 48 | 71,000 |
| Coils 43, 48 | 45 | 67,000 |
| Coils 42, 47 | 38 | 56,000 |
| Coils 41, 46 | 30 | 44,000 |
| Coils 40, 45 | 19 | 28,900 |

In Table III I have summarized the total combined cross-sectional areas of the main and auxiliary windings for twelve slots of the uniform slot size stator member of the illustrative example, in which the improved winding arrangement of the invention is incorporated and a comparable stator member having a conventionally shifted auxiliary winding. For the sake of convenient reference, I have used the reference numerals of the slots shown in FIGURE 1 to identify the corresponding slots of the motors compared in Table III. It will be understood that a uniform slot size stator member with 24 slots was used in this illustrative example.

*Table III*

| Slot No. | Total wire cross-sectional area in circular mills for motor with improved winding arrangement and with uniform slot sizes | Total wire cross-sectional area in circular mills for motor with conventionally shifted auxiliary winding |
|---|---|---|
| Slot 11 | 79,000 | 71,000 |
| Slot 12 | 74,000 | 86,000 |
| Slot 13 | 81,000 | 80,000 |
| Slot 14 | 72,000 | 72,000 |
| Slot 15 | 56,000 | 58,000 |
| Slot 16 | 30,000 | 30,000 |
| Slot 17 | 30,000 | 28,000 |
| Slot 18 | 56,000 | 62,000 |
| Slot 19 | 72,000 | 63,000 |
| Slot 20 | 81,000 | 56,000 |
| Slot 21 | 74,000 | 67,000 |
| Slot 22 | 79,000 | 71,000 |

From the summary of the areas presented in Table III, it will be apparent that the winding symmetry is maintained in the motor employing an auxiliary winding 50 with the direct axis and quadrature sections 51, 52, 53, 54. Further, it will be seen the coil receiving areas of corresponding slots are more effectively used in the motor 75 employing the improved winding arrangement of the invention.

By way of a further exemplification of the invention, a motor having a stator member with slots of the type shown in FIGURE 1 was constructed with an auxiliary winding 50 designed to provide an effective axis displaced 105 degrees from the main winding axis so that a comparison could be made with a similar conventional motor. In Table IV the total combined cross-sectional area of the main and auxiliary windings for twelve slots of this motor and a comparable conventional motor are set forth.

*Table IV*

| Slot No. | Total wire cross-sectional area in circular mills for slot motor with improved winding arrangement and with non-uniform slot sizes | Total wire cross-sectional area in circular mills for motor with a conventionally shifted auxiliary winding |
|---|---|---|
| Slot 11 | 86,000 | 84,000 |
| Slot 12 | 86,000 | 64,000 |
| Slot 13 | 60,000 | 42,000 |
| Slot 14 | 65,000 | 56,000 |
| Slot 15 | 69,000 | 61,000 |
| Slot 16 | 29,000 | 27,000 |
| Slot 17 | 29,000 | 34,000 |
| Slot 18 | 69,000 | 73,000 |
| Slot 19 | 65,000 | 67,000 |
| Slot 20 | 60,000 | 64,000 |
| Slot 21 | 86,000 | 80,000 |
| Slot 22 | 86,000 | 84,000 |

It will be noted from the data summarized in Table IV that a more symmetrical distribution is achieved in the motor employing the split auxiliary winding in accordance with the invention. To demonstrate the performance characteristics of the two motors, performance tests were carried out, and the results of these tests are summarized in Table V.

TABLE V

| | Non-uniform slot motor with improved winding arrangement | Conventional motor with a shifted auxiliary winding |
|---|---|---|
| Breakdown torque (3000 r.p.m.) | 49.3 ounce-feet | 48.7 ounce-feet. |
| Full load efficiency | 79.4 percent | 79.5 percent. |
| Full load power factor | 97 percent | 97.6 percent. |
| Full load current | 6.4 amperes | 6.36 amperes. |
| Locked rotor torque | 5.3 ounce-feet | 4.75 ounce-feet. |
| Locked rotor current | 39.3 amperes | 39.12 amperes. |

In the illustrative example of the invention tested, the improvement in the locked rotor torque, as will be seen in Table V, can be attributed to the split auxiliary winding arrangement of the invention. The increase in the locked rotor torque is due to the improved winding distribution which allows the third harmonic in the winding distortion to aid the torque at low speeds. In other respects the performance characteristics of the two motors are essentially similar.

It will be appreciated, however, that in the motor used in the illustrative example an angle of 105 degrees was arbitrarily selected so that the performance of the motor could be compared with a conventional motor having the axis of the auxiliary winding effectively located at an angle of 105 degrees from the axis of the main winding. Thus, additional advantages can be achieved by placing the effective axis at the optimum location for a given motor design. For example, in a one horsepower capacitor split phase two pole, 115 volt induction motor, it was found that the minimum primary and secondary copper losses occurred when the axis of the effective secondary winding was approximately 116 degrees from the axis of the main winding measured opposite to the direction of the rotation. For various 115 volt, split phase motor designs the optimum location was found to be between 105 and 120 degrees from the main axis, the precise angle being dependent upon a number of factors, such as a capacitor size and the particular load. With a conventional shifted auxiliary winding arrangement, in many applications it is not possible to precisely fix the exact position of the auxiliary winding axis since the shift is carried out in steps of one half of a slot. An important advantage of the present invention is that a more nearly optimum location can be selected for the effective axis of the auxiliary winding since it is not dependent upon slot dimensions.

While I have shown and described what is presently considered to be the preferred embodiment of the invention as applied to a two pole capacitor split phase induction motor, it should be apparent that the winding arrangement of the invention is equally applicable to other types of split phase motors. Also, it will be obvious to those skilled in the art that many other changes and modifications may be made in the disclosed structure without departing from my invention. It is, therefore, intended in the appended claims to cover all such changes and modifications as fall within the true spirit and scope of my invention.

What I claim as new and desire to secure by Letters Patent of the United States is:

1. In a single phase single speed induction type motor, a stator member having a plurality of slots, a main winding positioned in slots to form at least two primary magnetic poles and permanently connected to provide the same magnetic poles for all operating conditions, each of said poles having coils disposed about a main pole axis, and an auxiliary winding associated with said main winding, said auxiliary winding comprising of a main axis section and a quadrature section associated with each of said primary magnetic poles, each of said sections being comprised of a group of coils, the coils of said direct axis sections being positioned symmetrically with respect to said main pole axis, each of said quadrature sections being positioned in quadrature relation with respect to said direct axis sections, and the effective turns of said direct axis sections and of said quadrature sections being selected to provide an effective axis having a predetermined angular relation of approximately 116 electrical degrees with respect to said main pole axis whereby copper losses of said windings occurring during operation of the motor are minimized.

2. In a single phase single speed induction type motor, a stator member having a plurality of slots, a main winding positioned in slots of said stator member and permanently connected to provide at least two primary magnetic poles of alternating polarity for operating said motor at a single running speed, each of said poles being formed by a number of coils distributed in slots and arranged concentrically with respect to a main pole axis, an auxiliary winding associated with said main winding and positioned in slots to form a first winding section and a second winding section, said first winding section being disposed in symmetrical relationship with respect to the main pole axis, said second section being disposed in quadrature relationship with respect to said main pole axis, and the effective turns $N_d$ and $N_q$, respectively, of each of said first and second sections being selected to provide a predetermined non-quadrature relationship in the range from 105 to 120 electrical degrees as determined in accordance with the expression $$\arc \tan^{-1} \frac{N_q}{N_d}$$

between the effective axis of the auxiliary winding and the main pole axis associated therewith.

(References on following page)

References Cited by the Examiner

UNITED STATES PATENTS

| | | | |
|---|---|---|---|
| 1,726,232 | 8/29 | Kennedy | 318—216 X |
| 1,780,881 | 11/30 | Kennedy | 318—225 X |
| 2,203,927 | 6/40 | Rutherford | 318—225 |
| 2,310,874 | 2/43 | Schiff | 318—225 |
| 2,812,459 | 11/57 | Smith | 310—198 |
| 3,062,978 | 11/62 | Smith | 310—166 |
| 3,068,389 | 12/62 | Cantonwine | 318—225 |

ORIS L. RADER, *Primary Examiner*.

JOHN F. COUCH, *Examiner*.